July 17, 1923.  1,462,224
H. C. BAUSERT
ELECTRIC COOKER AND MELTING POT
Filed Feb. 28, 1922  3 Sheets-Sheet 3
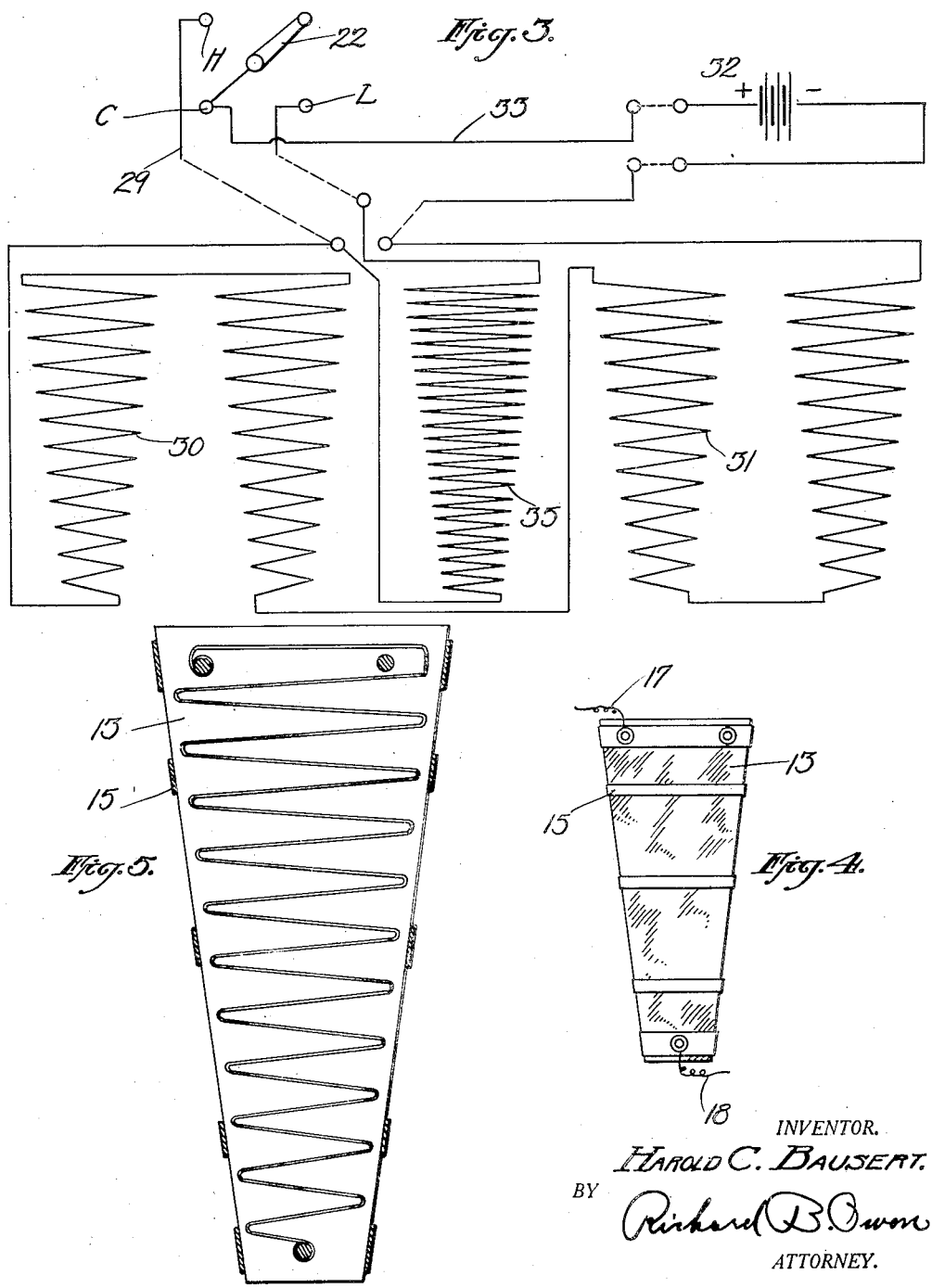
INVENTOR.
HAROLD C. BAUSERT.
BY Richard B. Owen.
ATTORNEY.

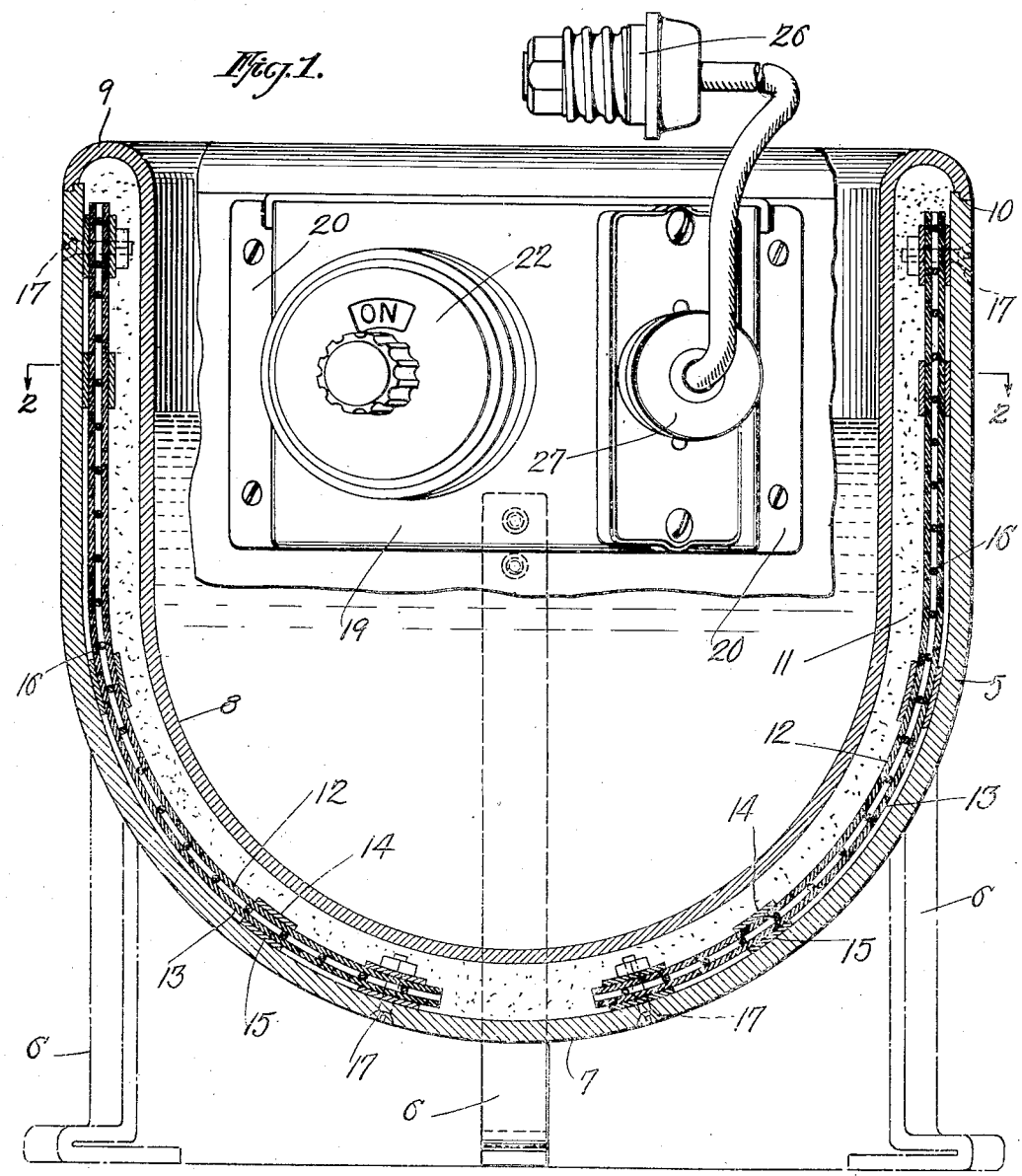

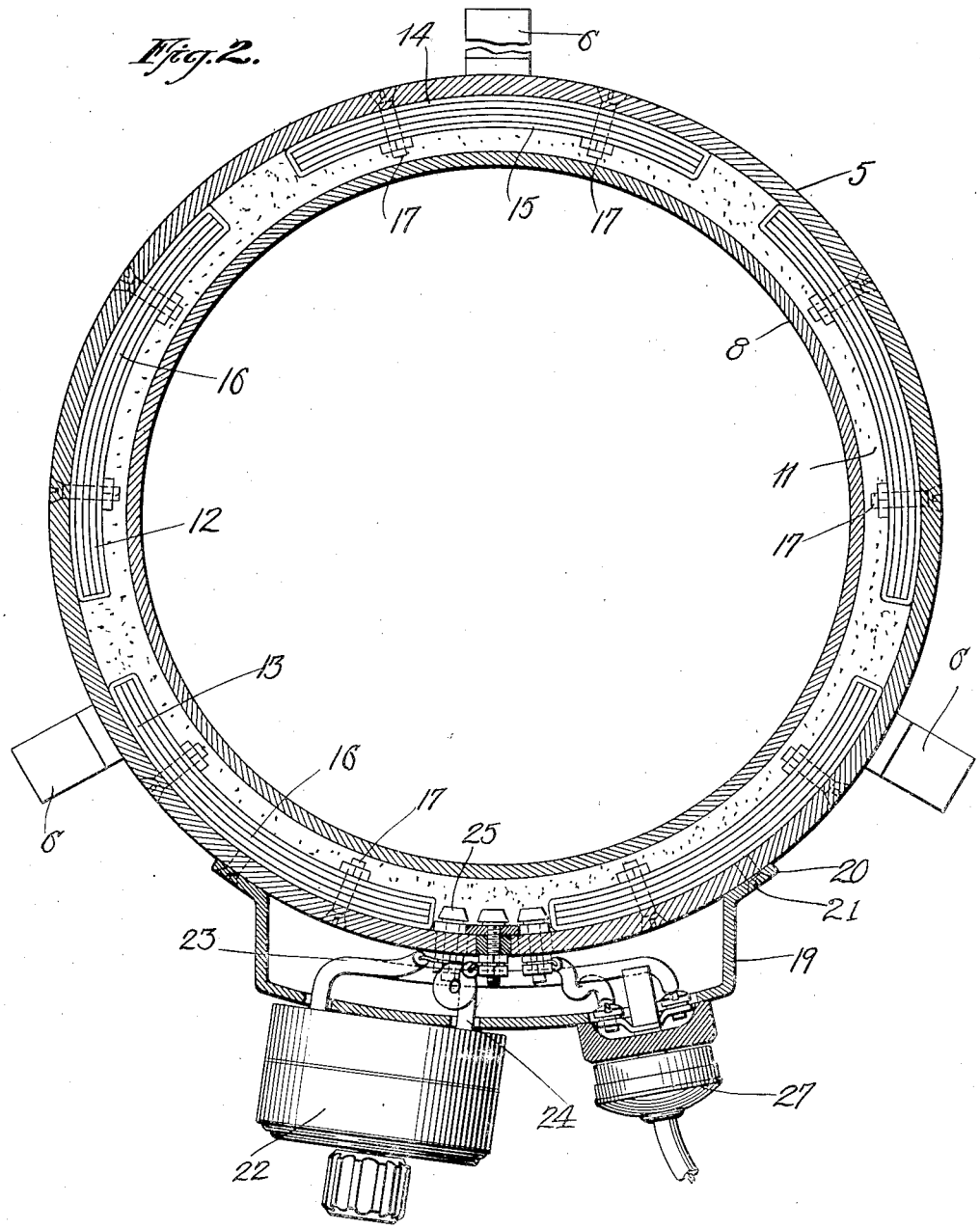

Patented July 17, 1923.

1,462,224

UNITED STATES PATENT OFFICE.

HAROLD C. BAUSERT, OF BROOKLYN, NEW YORK.

ELECTRIC COOKER AND MELTING POT.

Application filed February 28, 1922. Serial No. 539,946.

*To all whom it may concern:*

Be it known that I, HAROLD C. BAUSERT, a citizen of the United States, residing at Brooklyn, in the county of Kings and State of New York, have invented certain new and useful Improvements in Electric Cookers and Melting Pots, of which the following is a specification.

This invention relates to an electric melting pot or cooker and more particularly to a novel and improved receptacle wherein a high or low heat may be had to melt the metal or boil the contents thereof as desired.

One of the objects of the invention is the construction of an electrically operated melting pot or cooker including a switch controlled high and low resistance coil disposed within the walls of the pot or cooker whereby various degrees of heat may be had to fuse metals or cook the food depending on the purpose to which the pot is to be employed.

A continued and very important object of the invention is the provision of a melting pot or cooker of the class above set forth wherein the resistance coils are disposed between the inner and outer walls of the melting pot, and a switch device positioned on a casing exteriorly of the receptacle whereby a high or low heat may be had when the electrical connection is inserted in a feed line and source of current.

Another and equally important object of the invention is the construction of a melting pot or cooker capable of various designs and modifications the parts being extremely simple, easily assembled, rendering the device highly efficient in operation and use, practical, durable of universal application in various arts and otherwise adapted for manufacturing purposes at an extremely low cost whereby its commercial possibilities are greatly enhanced.

With these and other objects in view the invention consists in the construction and novel combination of parts hereinafter fully described, illustrated in the accompanying drawing, and pointed out in the subject matter being claimed, it being understood that various changes in the form, proportion and size and minor details of construction may be resorted to without departing from the spirit and scope of the invention.

In the drawings, I have for the purpose of illustration, shown my invention in one form by way of example and in which, Figure 1 is a transverse sectional view showing the heating element and the electrical connection on the outer wall of the pot or cooker, Figure 2 is a view taken on the line 2—2 of Figure 1.

Figure 3 is a diagrammatic view of the resistance coils.

Figure 4 is a detailed view showing one section of the coils in position between the walls of the receptacle and Figure 5 is an enlarged detailed view showing the resistance coils exposed.

Referring now to the drawings, wherein like reference characters designate corresponding parts throughout the several views, 5 designates the outer wall of the melting pot or cooker which as shown is annular although the same may take various forms and designs as the occasion may require, the said pot or cooker being supported by the vertical supports or standards 6 whereby the bottom 7 may be elevated from the ground. When the device is to be used as a melting pot, the outer wall 5 will be preferably constructed of cast iron of a substantial thickness and having a very high melting point. Of course where the device is to be used as cooker, the same may be constructed of aluminum or other metal having a melting point considerably lower than cast iron and in addition decreasing the weight of the cooker as such. The interior wall 8 which is spaced from the outer wall may also be constructed of cast iron or aluminum and is preferably of a less thickness than the outer wall, the top curved edge 9 being seated on the top rim of the outer wall 5, any suitable connection 10 for joining the inner and outer walls being provided. Between the inner and outer walls insulation of asbestos or mica designated by numeral 11 may be provided or, if so desired, no insulation need be used so that in the event the electrical conductors are to be replaced or a defect therein remedied, the same can be readily found.

The resistance coils are preferably held and maintained between the inner and outer strips 12, 13 of mica, said strips being secured by the bands 14, 15 placed at intervals from the top to the bottom of the mica strips as clearly shown by Figure 4 of the drawing. Referring to Figure 2 it will be observed that each section 16 of the connected strips is secured by the fastening screws 17, the heads of which are countersunk in the outer wall of the pot or cooker thus securely maintaining the resistance coils in position. The respective sections 16 gradually taper from the top to the bottom, the conductors 17, 18 being connected to the top and bottom bands on the mica strips above referred.

Attached to the outer wall 5, I have provided a segmental casing 19 the flanges 20 of which permit the same to be secured by counter-sunk screws 21 to the side of the pot and preferably adjacent the top thereof to which the switch 22 and the leads 23, 24 are connected with the contacts 25, the same being insulated as clearly shown by Figure 2 of the drawing. The socket 26 and connection 27 permits the same to be attached to any source of supply whereby the desired heat may be had.

Referring now to the diagrammatic view of Figure 3, I have designated one of the contacts by the letter H to indicate high temperature of heat, the conductor 29 being in circuit with the low resistance coils 30 and 31 in the line with the source of supply or battery 32 and of course back to the conductor 33 to the switch. In other words when a very high heat is desired the switch may be moved to make the proper contact and the full supply of current obtained. On the other hand when the switch 22 makes contact with the contact post designated L for low temperature of heat, the current will pass through the high resistance coil 35 as well as through the coils 30, 31 above referred to and thus giving a low temperature of heat.

By reason of this construction it will be readily seen that if a quantity of material is raised to a melting point by the very high heat produced, and it is desired to maintain a certain quantity of heat in the receptacle or in other words prevent the material from congealing, the switch may be turned to the low contact point and due to the increased resistance a low heat will be obtained to keep the metal, for instance, in a state of flux. On the other hand, it is possible with my arrangement and device to first bring the material or metal gradually to its fluid state and then increase the heat if so desired.

While I have shown and described my invention as more or less appertaining to a melting pot, it will be readily observed that the same can also be utilized as an electric cooker since the material of construction may be altered depending on the particular purpose to which the invention is to be applied. In the accompanying drawings, I have illustrated my invention embodied in one form by way of example, and which construction has been found to answer to a satisfactory degree the results to be obtained. It would be manifest, however, that other forms of embodiment may be adopted, and that the construction may be variously changed and modified by the skilled mechanic without departing from the limits of the invention. Further it will be understood that the invention is not limited to any particular form of construction in the parts, except in so far as such limitations are specified in the subject matter being claimed.

Having thus described my invention, what I claim as new, and desire to secure by United States Letters Patent is:—

1. An electric heating device of the class described, comprising an outer receptacle, and an inner receptacle nesting thereon, said receptacles being uniformly spaced, and high and low resistance heating units secured to the outer receptacle and disposed between the space defined by said receptacles, whereby high or low heat may be generated.

2. An electric heating device of the class described, comprising an outer receptacle and an inner receptacle, uniformly spaced from each other and a plurality of connected, high and low resistance heating unit confined within the space between the receptacle whereby high or low heat may be generated.

3. An electric heating device of the class described comprising an annular outer receptacle and an inner receptacle nesting thereon, means attaching to said outer receptacle for supporting the bottom thereof, said outer receptacle being of increased thickness than the inner receptacle and uniformly spaced therefrom, a plurality of radially disposed high and low resistance heating units disposed within the space defined by the outer and inner receptacles and switch means exterior of the receptacles whereby a high or low heat may be generated.

4. An electric heating device of the class described comprising an outer receptacle and an inner receptacle nesting thereon, standards for supporting the bottom of outer receptacle, said outer receptacle being of substantial increased thickness than the inner receptacle and uniformly spaced therefrom, a plurality of insulated high and low resistance heating units secured to the outer receptacle and disposed in the space defined between the inner and outer receptacles, a segmental casing attached to the exterior of the outer casing and switch means on the casing whereby a high or low heat may be generated.

In testimony whereof I affix my signature in presence of two witnesses.

HAROLD C. BAUSERT. [L. S.]

Witnesses:
CLARENCE D. STOFIEL,
JAMES F. PHILP.